(12) United States Patent
Sutter

(10) Patent No.: US 8,100,090 B1
(45) Date of Patent: Jan. 24, 2012

(54) ANIMAL HARNESS AND METHOD OF TYING

(76) Inventor: Janice M. Sutter, Reading, PA (US)

(*) Notice: Subject to any disclaimer, the term of this patent is extended or adjusted under 35 U.S.C. 154(b) by 0 days.

(21) Appl. No.: 12/925,745

(22) Filed: Oct. 28, 2010

Related U.S. Application Data

(60) Provisional application No. 61/272,750, filed on Oct. 28, 2009.

(51) Int. Cl.
*A01K 27/00* (2006.01)

(52) U.S. Cl. .................... 119/793; 119/792; 119/856

(58) Field of Classification Search .................. 119/712, 119/769, 792, 793, 795, 771, 814, 818, 856, 119/863, 864, 905, 907; D30/144, 151, 152; 54/71
See application file for complete search history.

(56) References Cited

U.S. PATENT DOCUMENTS

| | | | | |
|---|---|---|---|---|
| 4,964,369 A * | 10/1990 | Sporn | | 119/864 |
| 5,370,083 A * | 12/1994 | Sporn | | 119/864 |
| 5,383,426 A * | 1/1995 | Krauss | | 119/793 |
| 5,676,093 A * | 10/1997 | Sporn | | 119/792 |
| 5,713,308 A * | 2/1998 | Holt, Jr. | | 119/856 |
| 5,934,224 A * | 8/1999 | Sporn | | 119/792 |
| 5,937,794 A * | 8/1999 | Hediger | | 119/856 |
| 6,085,694 A * | 7/2000 | Simon | | 119/792 |
| 6,397,784 B1 | 6/2002 | Morgan-Albertson et al. | | |
| 6,401,666 B1 * | 6/2002 | Kircher | | 119/792 |
| 6,708,650 B1 * | 3/2004 | Yates | | 119/792 |
| 7,963,256 B1 * | 6/2011 | Horgan | | 119/792 |

* cited by examiner

*Primary Examiner* — T. Nguyen
(74) *Attorney, Agent, or Firm* — Robert B. Famiglio, Esq.; Famiglio & Associates

(57) ABSTRACT

Apparatus and method for an animal harness and restraint system is provided. An animal restraint is created from a single continuous piece of cord in which a loop is fashioned in the rope approximately half way from each free end of the rope. Beginning with the loop placed over the rear neck area of an animal above its shoulders, each free end of the rope is brought around opposite sides of the animal neck, down the chest of the animal with several twists of the rope combining both free ends then separating. Each free end of the rope is then brought separately around the front leg of the animal to meet the loop with each end being pulled there through and to the rear of the animal to fashion a leash. The free ends may be wrapped twice through the looped portion to fashion a simple prusik-like friction means to secure the thus fashioned harness but allows slipping of the rope as may be desirable as the animal moves. The two free ends of the rope are then tied in a simple knot at the end of the rope to present a reigns or leash to control or restrain the animal.

5 Claims, 3 Drawing Sheets

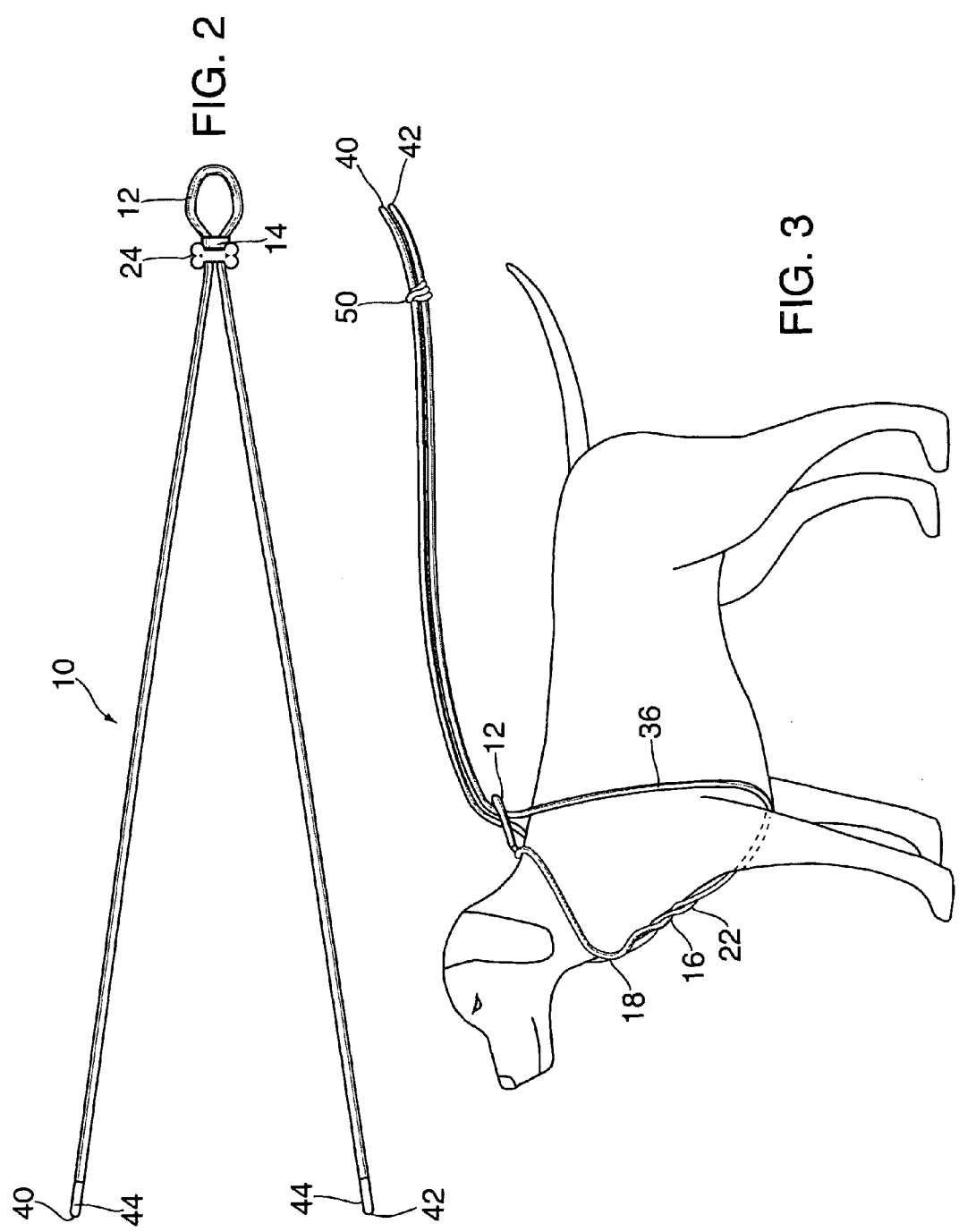

ANIMAL HARNESS AND METHOD OF TYING

CROSS REFERENCES TO RELATED APPLICATIONS

The applicant claims the benefit of her provisional patent application Ser. No. 61/272,750 filed Oct. 28, 2009 in the United States Patent and Trademark Office.

BACKGROUND OF THE INVENTION

1. Field of the Invention

The present invention relates to animal restraints, and more specifically to an animal leash apparatus and method of tying the leash.

2. Background of the Invention and Related Art

Animal leashes, and in particular leashes used for almost all breeds of canines are generally well known and in widespread use. Animal restraints used in the prior art describe means to limit the range of mobility of an animal relative to a given reference point such as the owner of an animal or an individual walking, for example, a dog. Typical prior art harnesses or leashes may be as simple as a collar with loop devices or other affixing means to attach a rope or other type of leash to the collar to hold back an animal being walked or to otherwise temporarily restrain the animal around a tree or post. There have been slip-in choke collars known to those skilled in this art which are thought by many to be less satisfactory and sometimes an inhumane means for restraining an animal.

Likewise, various sophisticated but complex mechanisms have been devised which wrap the torso of a four-legged animal, more particularly a canine. Typical harnesses wrap around the torso of the animal to provide an even distribution of the restraint around the neck of the dog as well as the torso of the dog by harnessing a larger part of the body of the animal with adjustable belts and collars which must be fitted to the animal. Animal restraints are sometimes comprised of various separate lengths of flexible belting, cables or ropes which can be in any number of various forms, including nylon webbing, leather strapping or the like.

In prior art restraints which use metal rings, at least one of the metal rings is employed as a joint to join several lengths of belting or straps to one another to form a leash and can include metal buckles, springs, automatic deployment and spring loaded retrieval mechanisms and other improvements provided over the years. However, in a simplest form, an animal restraint has typically been a rope tied around the animal, typically the animal's neck and/or torso in a fashion to crudely restrain the animal when a more sophisticated multi-part harness, chain, leash or other apparatus is not available or is otherwise unsatisfactory. Such methods are crude at best and do not provide for the freedom or comfort of the animal while providing an effective or attractive leash mechanism.

A simpler, single rope device is necessary and desirable along with a method of restraining an animal which uses a single piece of rope and allows for the comfort of the animal, room for the animal to move and provides safety for both the animal being restrained and the animal handler holding the end of the rope or leash mechanism.

SUMMARY OF THE INVENTION

In accordance with the apparatus and the method of the invention so described herein, the present invention is an animal restraint apparatus comprised of a single, continuous length of cord or rope having a simple loop formed at or about the center of the length of rope, such loop being formed with a clamp affixing the rope to form the loop, and the method of applying the leash thus created to the animal in an effective and useful fashion.

The method described herein provides for a loop to be formed in the length of rope and placed across the back of the neck of the dog or other animal to be restrained. The free, working ends of the rope are then brought around the dog's neck to the chest where it is twisted several times, the number of twists depending on the size of the animal to be restrained. The free end of each rope is thus brought up behind the dog or other animal's front legs to meet the loop. The rope free ends are run upward through the loop twice. Thereafter the harness is directed away from the loop, generally to the rear of the animal. A knot is placed at the far end of the rope to secure the two free ends of the rope thus forming the leash so described.

It is therefore the object of the present invention to provide a simple leash mechanism which can be constructed from a single length of rope or other cable of any material without the need for additional hardware, buckles, connectors or other apparatus in its simplest form.

It is also an object of the present invention to illustrate a novel and useful method of harnessing an animal with a single length of rope utilizing a tying technique and method of forming the leash which is flexible and field adjustable to different sized animals and requires no special training or unusual skill to create.

It is also the object of the present invention to provide an apparatus and a method of producing a harness mechanism which requires only a simple knot to apply, and does not require the user to remember complicated knots or wrapping techniques as is presented in the prior art methods.

BRIEF DESCRIPTION OF THE DRAWINGS

FIG. 2 is a pictorial illustration of the leash apparatus in its simplest form, untied and before it is applied to an animal as a harness.

FIG. 3 is a pictorial view of the animal to be restrained illustrating the leashing method and use of the apparatus as the free ends of the leash are brought up and through the loop formed above the neck of the animal.

DETAILED DESCRIPTION OF THE INVENTION

In understanding how the invention operates and how the advantage of the invention can most effectively be realized, reference to the various drawings in conjunction with the following detailed explanation will provide a specific example of the invention in its most basic form. The invention will be described in detail with reference to the figures, wherein like numerals refer to like parts as shown in each figure.

Figure 1:
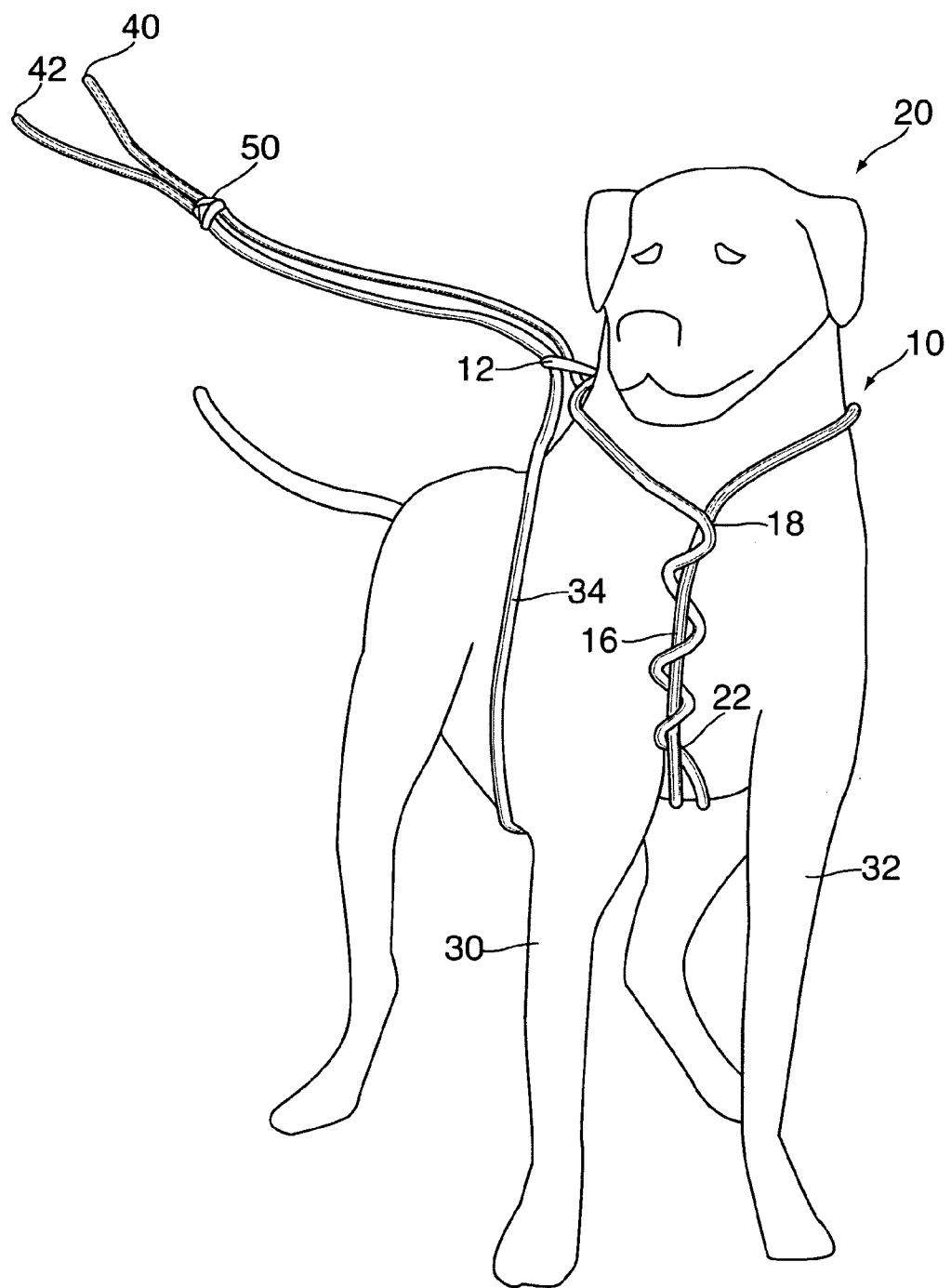
FIG. 1 is a pictorial view of the leash apparatus in place on a canine illustrating the method of tying and the placement of the apparatus around the neck and torso of the animal.

FIG. 1 illustrates the harness in place on the harnessed animal 20, in this example a canine, is wrapped with the harness using the method described. Harness 10, shown separately in FIG. 2, is comprised in its preferred embodiment of a polypropylene rope. A preferred length found to be useful for most sized animals is 16 feet to 22 feet in length and between ⅜ inch and ⅝ inch thick. Typical polypropylene ropes of this size are braided which provide for a soft and flexible rope which is easy to tie and to manipulate as well as being comfortable on the animal. An average medium sized dog up to about 80 lbs. would typically use a ½ inch thickness polypropylene rope which is found to work very well in actual practice.

To prevent the rope from unraveling or unbraiding itself, the free ends are capped using glued or clamped-on caps 44. It is not necessary that any special type of cap 44 be used and the rope free ends 40 and 42 can be stabilized by simply melting the rope by using short exposure to flame. It is also possible to dip the ends of the rope into a solution available for such use in order to place a plastic-like hardened coating on the end of the rope. The ends of the rope can also be wrapped with a stretchable plastic or vinyl tape to obtain the same function as end cap 44. The invention functions well without the ends of the rope being dressed as long as a braided rope does not unwrap. Heat fusing to melt and bind the rope ends can also be used.

The preferred embodiment of harness 10 includes loop 12 placed in the rope approximately halfway between rope ends 40 and 42. It is most desirable to place the loop at exactly the halfway point between free ends 40 and 42. In such a fashion, when tying the entire harness using the method described the rope ends 40 and 42 will meet at the same point. While, strictly speaking, this is not necessary for the harness to function it is convenient for the ends to meet at the same length.

To secure the loop from slipping, a loop clamp 14 is used which is a compression-style clamp screwed on or clamped onto the rope to secure loop 12 at a size which is satisfactory for the size of the animal and the size of the rope to be used. Loop 12 should be of a size in which it will be possible to easily pass rope ends 40 and 42 twice through the loop as will be illustrated below. A diameter of approximately three inches works well.

In its simplest form, it is possible to create loop 12 by tying a knot where loop clamp 14 is shown. The knot to be used to secure loop 12 can be one of various different common knots as long as the knot is of a type that can reasonably secure loop 12 and allow it to maintain its size even when moderate tension is applied to the leash. Clamp 14 is a device which applies compression to the two rope ends in a fashion to prevent them from slipping thereby allowing loop 12 to be firmly set. Many different rope-clamp and rope-splicing devices are available to create clamp 14 which secures loop 12.

A typical example of a commercial product which can be used to form the loop without a knot is produced by Shell Engineering, Inc., which does business as E-Z-Ty. Different devices can be purchased which allow the rope to pass through curved channels which clamp down on the rope to form loop 12. It is possible to use the invention and create the harness disclosed by using a simple knot in place of loop clamp 14. Clamp 14, however, is simple, effective and provides for a clean, professional appearance of the harness placed in service. Loop 12 can also be secured by using a rope ferrule or other type of rope clamp below the loop. For a simple, self-fabricated ferrule or clamp, a small hole is pre-drilled to attach a ring or an engraved dog tag with information as desired.

To that end, it is shown in FIG. 2 that an ID plate 24 can be attached to the clamp or placed close by presenting the registration information as may be necessary in some legal jurisdictions when walking a harnessed animal in public. Since dog tags or other registration information for an animal is frequently attached to a harness, the ID plate 24, shown in a decorative form of a bone, can be used as the holder of registration information or other identification.

Returning to FIG. 2, an improvement in the trim of the rope is seen by the placement of end caps 44. Cap 44, not shown in all the drawings, assures the rope ends 40 and 42 such as to stop fraying and allow a clean, finished look at each end of the rope. Using such decorative caps 44 are more attractive than tying off the end of the rope or melting the end of a polypropylene rope in order to prevent it from eventually unraveling itself.

Figure 4:
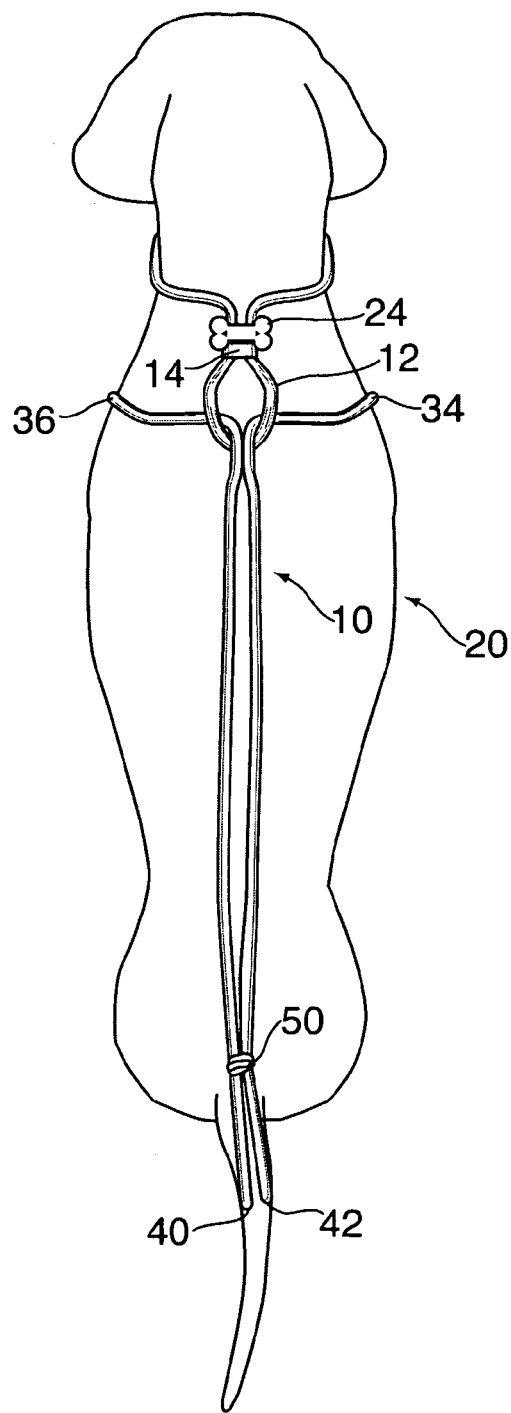
FIG. 4 is a close-up pictorial view of the free ends of the rope being brought through the loop formed in the rope.
Figure 5:
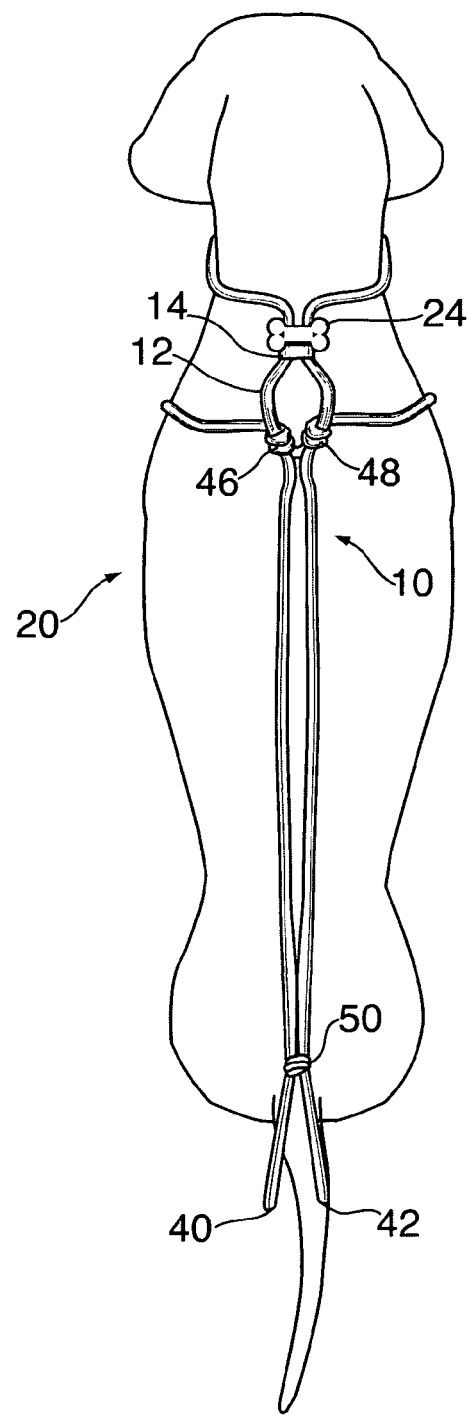
FIG. 5 is a pictorial view illustrating the rope being wrapped twice through the loop formed in the rope to create a prusik-like drag mechanism as described.

The various figures when read together illustrate how a single piece of rope can form an effective and comfortable leash for the animal 20 being restrained. Turning to FIG. 3, the method will be explained as a step by step illustration. Loop 12 is placed behind the neck of the animal as shown in FIG. 3, FIG. 4 and FIG. 5. One end of the rope is brought to the front chest or breast of the animal around one side of the neck with the opposite end of the rope being dressed around the opposite side of the animal's neck with the two rope ends joining again on the chest of the animal at convergence point 18.

FIG. 1 shows each end of the rope draped around the animal's neck and how the ends are secured loosely on the animal's front breast area with twist 16, separating again at point 22. The number of twist 16 depends on the size of the animal, but typically three or four twists are sufficient for an animal such as a medium or large sized canine as suggested in FIG. 1. Twist 16 need not be loose or too tight. While no specification for the tension applied is necessary, it should be appreciated that twist 16 is wrapped firmly enough to secure leash 10 around the animal without being uncomfortable for the animal by being pulled too tightly. The thicker rope used for the typical application of this invention is firm enough to stay in place with modest tension placed in wrapping the rope around where twist 16 lays against the chest of the animal as shown in the figures.

At separation point 22, each separate end of the rope is brought separately around the front legs of animal 20 as shown in FIG. 1 and FIG. 3. One end of the rope travels around the animal's front right leg 30, and ascends across the side of the animal at 34 toward the area where loop 12 is resting behind the animal's neck. In a similar fashion, the opposite side of the rope leaving separation point 22 is brought under the animal's front left leg 32, ascends up the side of the animal at 36 also meeting loop 12 behind the animal's neck. FIG. 4 and FIG. 5 demonstrate how rope ends 40 and 42 are brought through loop 12 and draped to the rear of animal 20. The leash will function in this simplest form though it has been found that to snug the leash satisfactorily, rope ends 40 and 42 are brought through loop 12 again once the ends are brought through the loop as shown in FIG. 4. By bringing the free ends of rope 40 and 42 through loop 12 once again, each rope end grips the rope that forms loop 12 in a fashion that provides some resistance to slippage thereby keeping animal harness 10 to remain in a fixed, unmovable position. FIG. 5 illustrates this double wrapping at point 46 on the left of loop 12 as viewed from the top of animal 20. Similarly, the rope ascending on the right side of the animal toward the loop would be double wrapped at point 48. This creates a type of prusik which prevents the leash from moving easily relative to loop 12. However, it can be appreciated that the double wrap of the harness through loop 12 as shown in FIG. 5 allows some slippage and is not firm or fixed such as with a harness which is buckled or clamped. FIG. 5 presents the preferred embodiment of the method because of the desirable effect created by the double wrapping through loop 12.

It can also be appreciated that a simplistic knot can be placed in the rope after passing it once through loop 12 if a double wrap is not desired. By placing a knot in between leash ends 40 and 42, with such knot being placed immediately after the leash exits loop 12 toward the rear of the animal (not shown), it would prevent the leash from traveling backwards through loop 12 if the leash is dropped. The double wrapping without a knot as shown in FIG. 5, however, has the same desirable effect yet allows more comfort and freedom for animal 20.

In any event, after placing the rope through loop 12, the free ends of the rope 40 and 42 are brought away from loop 12 rearward from animal 20 and tied together with leash end knot 50. Knot 50 serves as a convenience to provide a unified leash element and prevents a dropped rope from separately slipping back through the leash should the animal pull against leash 10 once it is in place.

Thus the leash apparatus and the method of tying the leash has been fully explained and should be clearly understood when considering the various figures illustrating the leash in use in a typical application. Although the invention has been described in accordance with a preferred embodiment and an alternative embodiment, it will be appreciated by those skilled in the art that the application of the present invention is useful in a variety of configurations and designs not specifically described above. All such designs and applications are considered to be within the scope of the present disclosure, and the invention is applicable across a wide variety of applications. Such applications are considered within the scope and spirit of the present invention.

What is claimed is:

1. A method of tying an animal restraint from a single length of cord comprised of the steps:

forming a loop in a length of rope between a first end and a second end of said rope and placing the loop behind the neck of the animal;

dressing the first end of the rope around the animal's neck, and dressing the second end of the rope around the animal's neck on the side of the neck opposite the side of the first end;

joining the ends of each rope again below the neck on the chest of the animal;

twisting each rope around each other along the chest of the animal sufficient to define a length along the front chest of the animal below the neck area to the bottom of the chest area;

then separating the ends of each rope wherein each rope being directed separately around the front legs of the animal and directed upwards, each separate rope end being directed upward around a separate side of the animal such that one rope ascending on one side with the other rope end ascending on the opposite side, back to the said loop and thus bringing each end of the rope through said loop.

2. The method in claim 1 wherein further the two ends of the rope are brought through said loop twice such that each rope end wraps at least twice around the loop before being draped away from the loop.

3. The method of claim 1 wherein the two ends of said rope are affixed together after said rope ends are brought through said loop.

4. The method of claim 1 wherein further the two ends of the rope are tied together at or in close proximity to, said ends to affix each rope end.

5. The method of claim 1 wherein the said loop formed in a length of rope is formed midway between said first end and said second end of the rope.

\* \* \* \* \*